United States Patent

[19]

Hestily

[11] 4,051,880
[45] Oct. 4, 1977

[54] DUSTLESS ROUTERS

[75] Inventor: Charles E. Hestily, Greenville, S.C.

[73] Assignee: The Singer Company, New York, N.Y.

[21] Appl. No.: 736,916

[22] Filed: Oct. 29, 1976

[51] Int. Cl.$^2$ ............................................. B27G 71/00
[52] U.S. Cl. .................. 144/252 R; 51/273;
90/DIG. 3; 90/12 D; 144/134 D; 408/67
[58] Field of Search .......... 144/134 D, 136 C, 251 R, 144/251 A, 252 R, 252 A; 51/273 R; 90/12 D, DIG. 3, 11 R; 408/67

[56] References Cited

U.S. PATENT DOCUMENTS

| | | | |
|---|---|---|---|
| 2,252,160 | 8/1941 | Blood | 51/273 |
| 2,268,863 | 1/1942 | Emmons | 51/273 |
| 3,594,958 | 7/1971 | Cusumano | 51/273 X |
| 3,785,092 | 1/1974 | Hutchins | 51/273 X |
| 3,786,846 | 1/1974 | Mehring | 144/252 R |
| 3,837,383 | 9/1974 | Ko | 408/67 X |
| 3,882,598 | 5/1975 | Earle et al. | 144/252 R X |

*Primary Examiner*—Harrison L. Hinson
*Assistant Examiner*—W. D. Bray

*Attorney, Agent, or Firm*—Edward L. Bell; Robert E. Smith; H. Weinstein

[57] ABSTRACT

A dustless portable electric router comprising a base having a dust chamber formed below a motor mounted to the base to be axially adjustable therein. A pair of handles are connected to the base with a passage formed in one of the handles in communication with the dust chamber. A blower is formed on the top side of the motor with the router connected to and driven by an extension from the motor armature shaft. A flexible conduit interconnects the handle passage and the blower, and a dust bag collects the dust and debris from the blower discharge.

The dust chamber has side openings which are enclosed by detachably connected plastic shrouds that provide operator visibility. A light is connected in the other handle and serves to illuminate the dust chamber and the surrounding work. The dust bag is hung from the blower at the "back" of the router housing, and the blower is positioned remote from the work engaging flat bottom of the router base. The conduit which interconnects the handle and blower is flexible to permit axial adjustment of the motor within the base.

10 Claims, 5 Drawing Figures

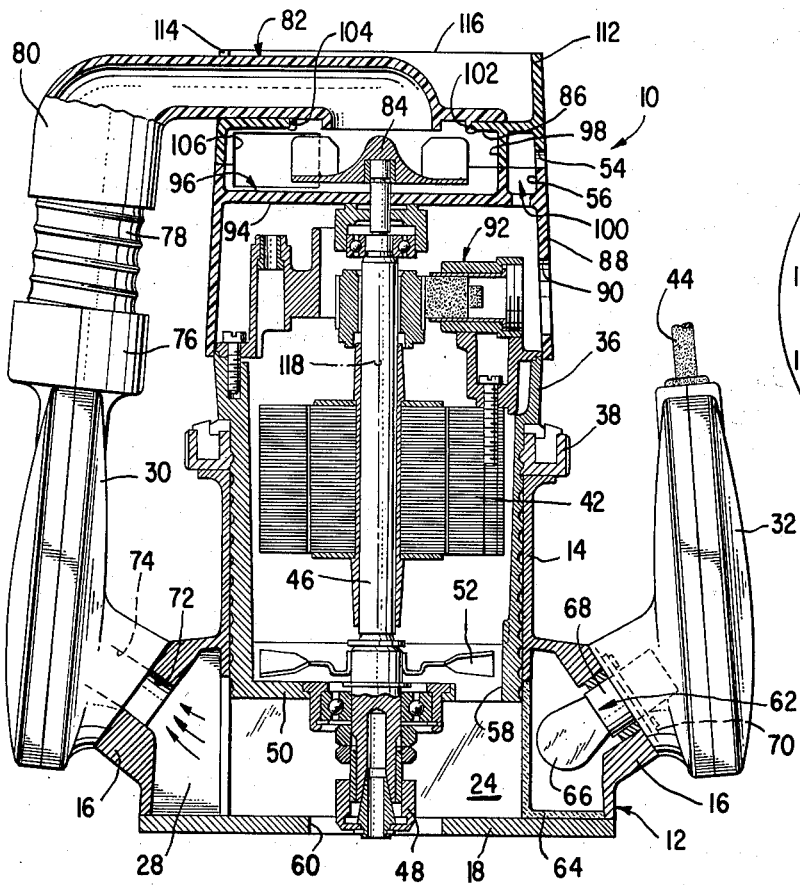
Fig.1
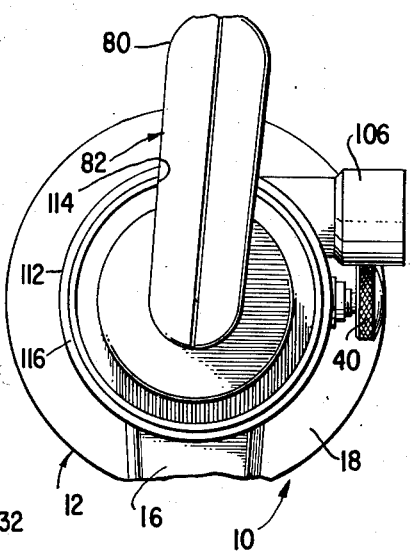
Fig.3
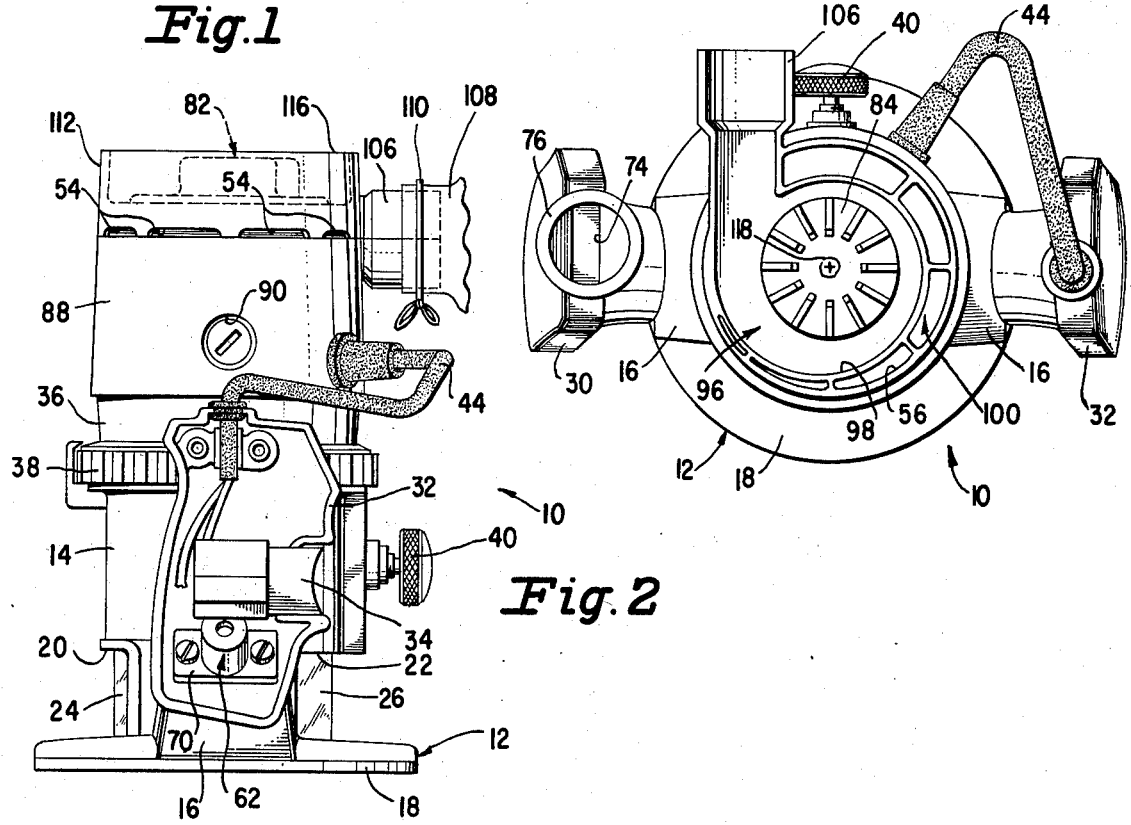
Fig.2
Fig.4

DUSTLESS ROUTERS

BACKGROUND OF THE INVENTION

Heretofore, in the prior art routers have made use of the motor fan to blow away dust and debris. This proved unsatisfactory in that while it may clear the immediate area of the bit the dust is indiscriminately blown so as to interfere with operator visibility. Also, later clean up is aggravated by the scattering of the dust and debris.

Routers have also been used in combination with remotely located vacuum cleaners wherein separate hoses are required to interconnect the router and the vacuum cleaner so as to be cumbersome in use and to limit freedom of movement of the routers. Operator visibility may also be limited as a collection chamber must be formed so as to modify the router base.

SUMMARY OF THE INVENTION

It is an object of the present invention to provide an improved dustless router which overcomes the prior art disadvantages; which is simple, economical and reliable; which includes an integrally connected dust collection system; which has a dust chamber in communication with a handle passage interconnected by a flexible conduit to a blower which draws the dust therein and discharges it into a dust bag; which uses a blower remote from the base; which blows motor ventilation air into the dust chamber; which uses clear plastic shrouds to enclose open sides of the dust chamber; which uses a pair of handles, one having a dust passage, and the other having a light, each adjacent to and communicating with the dust chamber; and which has the blower vertically above the handles.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a front elevational view, partly in section, of a portable electric router embodying the present invention.

FIG. 2 is a side elevational view, partly in section, of the router embodying the present invention.

FIG. 3 is a top plan view of the blower and a partial view of the router base in the same position as is shown in FIG. 2, namely with the router turned 90° clockwise from that shown in FIG. 1.

FIG. 4 is a top plan view with the blower housing split to expose the rotor thereof.

DESCRIPTION OF THE INVENTION

Figure 5:
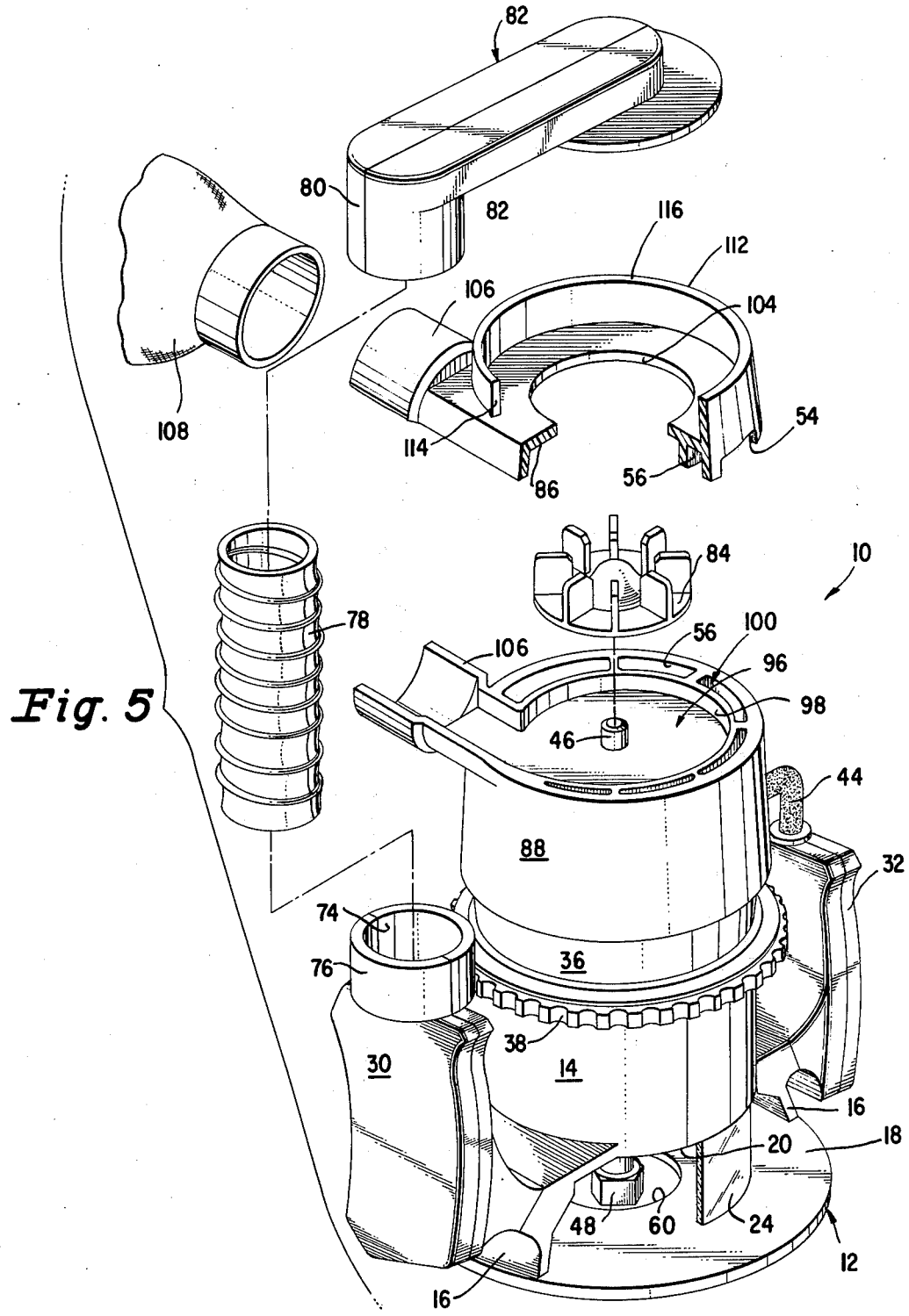
FIG. 5 is a perspective view of the portable electric router embodying the present invention wherein the blower flexible conduit and dust bag have been exploded.

In the illustrated embodiment of the invention a router, designated generally as 10, is depicted in FIGS. 1 and 2 as having a stationary base 12 the upper portion of which is in the form of a cylindrical sleeve 14. The sleeve 14 has two downwardly extending diametrically opposed struts 16 which terminate in a flat bottom 18 that will contact the work (not shown). Large openings 20 and 22 are provided on opposite sides of the struts 16 between the sleeve 14 and the bottom 18 through which the operator may observe the work. The openings 20 and 22 are enclosed by detachably connected plastic shrouds or windows 24 and 26, respectively, so as to enclose the sides of a dust chamber 28 formed in the hollow interior of the base 12 without interfering with operator visibility as shown in FIGS. 1 and 2.

A pair of handles 30 and 32 shown in FIGS. 1 and 4 are connected to the struts 16. The handle 32 appearing on the right side of FIGS. 1 and 4 is shown in FIG. 2 as having a trigger switch 34 mounted therein for controlling actuation of the router 10.

A motor housing 36 as shown in FIGS. 1 and 2 is adapted to telescope within the base 12 for vertical sliding motion relative thereto. A suitable depth of cut adjustment mechanism 38 illustrated in FIGS. 1 and 2 is rotated to adjust the depth of cut of the router 10. A clamp 40 shown in FIGS. 2, 3 and 4 which when tightened will clamp the motor housing 36 in adjusted position, or when loosened will permit adjustment thereof via mechanism 38.

A series commutator electric motor 42 is journaled in the motor housing 36 and in circuit with the trigger switch 34 via switch cable 44, and a power cable (not shown). The motor 42 has an armature shaft 46, the lower end of which has affixed thereto a bit carrying chuck 48 disposed externally of the lower wall 50 of the motor housing 36. A fan 52 is affixed to the armature 46 adjacent the lower wall 50 on the internal side thereof. The fan provides ventilation for the motor by drawing air in through apertures 54 and passage way 56 formed adjacent the upper end of the motor housing 36 as illustrated in FIGS. 1 and 2, and exhausting it through apertures 58 of the lower wall 50, one of which is shown in FIG. 1, to blow directly into the dust chamber 28.

The chuck 48 extends into the dust chamber 28 in alignment with a central aperture 60 formed in the flat bottom 18 to permit the bit (not shown) to engage the work. The dust chamber 28 is illuminated by a light 62 mounted in handle 32, with the light 62 connected to be lit whenever the switch 34 is on. A plastic guard 64 is fitted on the internal side of the strut 16 to protect the bulb 66 of the light 62. The guard 64 is disposed below the sleeve 14 at a radial distance equal to the sleeve 14 so as not to interfere with the adjusting movement of the motor housing 36. The light 62 has a socket 68 to which the bulb 66 is connected, with the sockets affixed to a bracket 70 which serves to connect the light 62 within the strut 16.

The opposite strut 16 has a dust passage 72 aligned with a dust passage 74 formed in the handle 30. The dust passage 74 extends the full length of the handle 30 which terminates in a circular collar 76. The collar 76 is sized to snuggly receive the lower end of a flexible conduit or hose 78. The upper of which is received in a rigid inlet conduit 80 of a blower 82, which inlet has an internal diameter substantially equal to that of the collar 76. The conduit 80 will axially introduce the flow in the blower 82 to a rotor 84 affixed to an upper extension of the armature shaft 46 which extends into the blower portion 86 of the motor housing 36.

The blower portion 86 of the motor housing 36 is formed in an end cap 88 which may conveniently be made of a suitable plastic material. A brush access 90 is formed in the end cap in spaced relation to the brush assembly 92 of the motor 42. A partition wall 94 divides the end cap 88 with the motor 42 disposed below and the blower 82 disposed thereabove. A blower convolute 96 is formed on the internal side of a vertical partition wall 98, on the external side thereof is formed a motor inlet convolute 100 which communicates the inlet passageway 54 and 56 with the motor portion of the housing 36. The inlet conduit 80 is connected by tabs 102 within a central opening 104 of the blower 82 as illustrated in FIGS. 1, 4 and 5. The blower convolute 96 delivers the discharge from the rotor 84 to a discharge outlet 106 having a dust bag 108 detachably connected thereto by a suitable tie string 110.

The end cap 88 has a vertical flange 112 shown in FIGS. 1, 3 and 5 to be slotted at 114 through which the rigid inlet conduit 80 passes and is positioned. The conduit 80 lies below the flat upper edge 116 of the flange 112.

Actuation of the rotor 10 will produce rotation of the fan 52 to ventilate the motor 42, and rotation of the rotor 84 of the blower 82. The blower 82 will draw air from the dust chamber which air will include dust and debris whenever the router 10 is operated on work. The drawn air will enter dust passages 72 and 74, and then pass the flexible conduit 78 into the conduit 80 for axial delivery to the rotor which discharges the dust laden air into the convolute 96 and outlet 106 for collection in the dust bag 108.

The shrouds 24 and 26 provide good operator visibility of the cutting operation of the router. This is further enhanced by the light 62 which illuminates the dust chamber 24 and the surrounding work area.

The router 10 is designed in quadrant fashion as best seen in FIG. 4 whereby the handles lie along a line on either side of the axis 118 of the armature shaft 46, while the discharge outlet 106 of the blower 82 is disposed perpendicular to such line and parallel to the clamp 40 at what may be termed the "rear" of the router 10. This leaves the "front" of the router 10 clear for better operator visibility. Visibility is also aided by not only locating the dust bag 108 at the "rear" of the router 10, but also by locating the blower 82 in a local remote from the flat bottom 18 and above the handles 30 and 32.

The flexible conduit 78 is expandable and contractable so as to permit free adjustment of the motor housing 36 in setting of the depth of cut of the router 10, while still maintaining connection between the collar 76 and the inlet conduit 80.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention, what is claimed herein is:

1. A dustless portable electric router comprising:
 a. a base having a dust chamber formed therein,
 b. a handle connected to the base,
 c. a passage formed in the handle in communication with the dust chamber,
 d. a motor mounted to the base to be axially adjustable therein,
 e. the motor having a shaft therein rotatable to actuate the router,
 f. a blower having a rotor affixed to and rotatively driven by the motor shaft,
 g. a conduit interconnecting the handle passage to the blower whereby dust and debris collected in the dust chamber will be drawn into and discharged from the blower, and
 h. a dust bag connected to the blower to collect the blower discharge.

2. The combination claimed in claim 1 wherein:
 a. the conduit is externally connected between the handle and the blower, and
 b. the conduit is flexible in the axial direction to permit axial adjustment of the motor while remaining connected between the handle passage and the blower.

3. The combination claimed in claim 1 wherein:
 a. a pair of handles are connected to the base diametrically opposite each other, and
 b. the dust bag is connected on one side of the blower intermediate the pair of handles, and is connected to the blower above the handle.

4. The combination claimed in claim 3 wherein:
 a. one of the handles has the dust passage formed therein in communication with the dust chamber, and
 b. the other handle has an externally actuated trigger switch mounted therein in circuit with the motor, and an internally disposed electric light to illuminate the dust chamber.

5. The combination claimed in claim 4 wherein:
 a. the dust chamber has an opening on at least one side adjacent the handles connection to the base, and
 b. a plastic shroud detachably connected in the opening of the dust chamber to permit operator visibility in the dust chamber and to illuminate the surrounding work.

6. The combination claimed in claim 5 wherein:
 a. the dust chamber has a pair of openings on diametrically opposed sides opposite the pair of handle connections to the base, and
 b. a pair of clear plastic shrouds detachably connected in the openings to completely enclose the sides of the dust chamber and permit operator visibility in the dust chamber from either side of the handles.

7. The combination claimed in claim 3 wherein:
 a. the base has a flat bottom for work engaging,
 b. the base bottom has an aperture therethrough in communication with the dust chamber,
 c. a pair of struts extends upwardly on opposite sides of the bottom,
 d. a sleeve is connected to the struts in spaced relationship to the bottom,
 e. a housed motor is axially adjustably mounted in the sleeve and enclosing the top of the dust chamber,
 f. a bit carrying chuch is drivingly connected to the motor shaft and extending through the dust chamber in alignment with the bottom aperture,
 g. each of the handles are connected to one of the struts,
 h. the handle passage extends through an opening in the strut, and
 i. plastic shrouds are connected to the base to enclose the area between the sleeve and the bottom to form see through sides for the dust chamber whereby the operator may view the dust chamber from either side of the router.

8. The combination claimed in claim 7 wherein:
 a. a light is connected to the handle not having the passage, whereby the dust chamber will be visible and the surrounding work will be illuminated.

9. The combination claimed in claim 7 wherein:
 a. a fan is affixed to the shaft of the motor, and
 b. the fan discharges ventilation air into the dust chamber.

10. The combination claimed in claim 9 wherein:
 a. the blower is mounted remote to the base bottom, and
 b. the fan is mounted adjacent the dust chamber.

* * * * *